United States Patent [19]
Engelke

[11] Patent Number: 6,135,137
[45] Date of Patent: Oct. 24, 2000

[54] INDEXED COUPLER FOR POSITIONING A SHAFT IN MULTIPLE ANGULAR POSITIONS

[75] Inventor: Roger P. Engelke, Holland, Mich.

[73] Assignee: Hart & Cooley, Inc., Holland, Mich.

[21] Appl. No.: 09/342,273

[22] Filed: Jun. 29, 1999

Related U.S. Application Data

[60] Provisional application No. 60/093,210, Jul. 17, 1998.

[51] Int. Cl.[7] .................................................. F16K 51/00
[52] U.S. Cl. .......................................... 137/270; 251/305
[58] Field of Search ..................... 137/270, 269; 251/305

[56] References Cited

U.S. PATENT DOCUMENTS

| | | |
|---|---|---|
| 912,170 | 2/1909 | Rittersbacher . |
| 977,704 | 12/1910 | Brownlee . |
| 2,295,685 | 9/1942 | Place . |
| 2,856,214 | 10/1958 | Schrimshaw . |
| 2,961,479 | 11/1960 | Bertling . |
| 2,968,850 | 1/1961 | Tinnerman . |
| 2,971,355 | 2/1961 | Walsh . |
| 2,976,793 | 3/1961 | Cole . |
| 4,123,001 | 10/1978 | Kolt . |
| 4,949,625 | 8/1990 | Miklos . |
| 5,007,613 | 4/1991 | Barker ..................................... 137/270 |
| 6,065,487 | 5/2000 | Watson ..................................... 137/271 |

*Primary Examiner*—Kevin Lee
*Attorney, Agent, or Firm*—Rader, Fishman, Grauer & McGarry

[57] ABSTRACT

A coupler for interconnecting a damper blade shaft having a keyed end with an actuator is provided whereby movement of the actuator is imparted to the damper blade shaft via the coupler. The coupler comprises a socket adapted to receive the keyed end of the damper blade shaft in at least two angular positions and a connector adapted to receive a portion of the actuator. The damper blade shaft can thereby be indexed to any one of the at least two positions relative to the actuator without additional fasteners when the keyed end of the damper blade shaft is received in the socket.

27 Claims, 4 Drawing Sheets

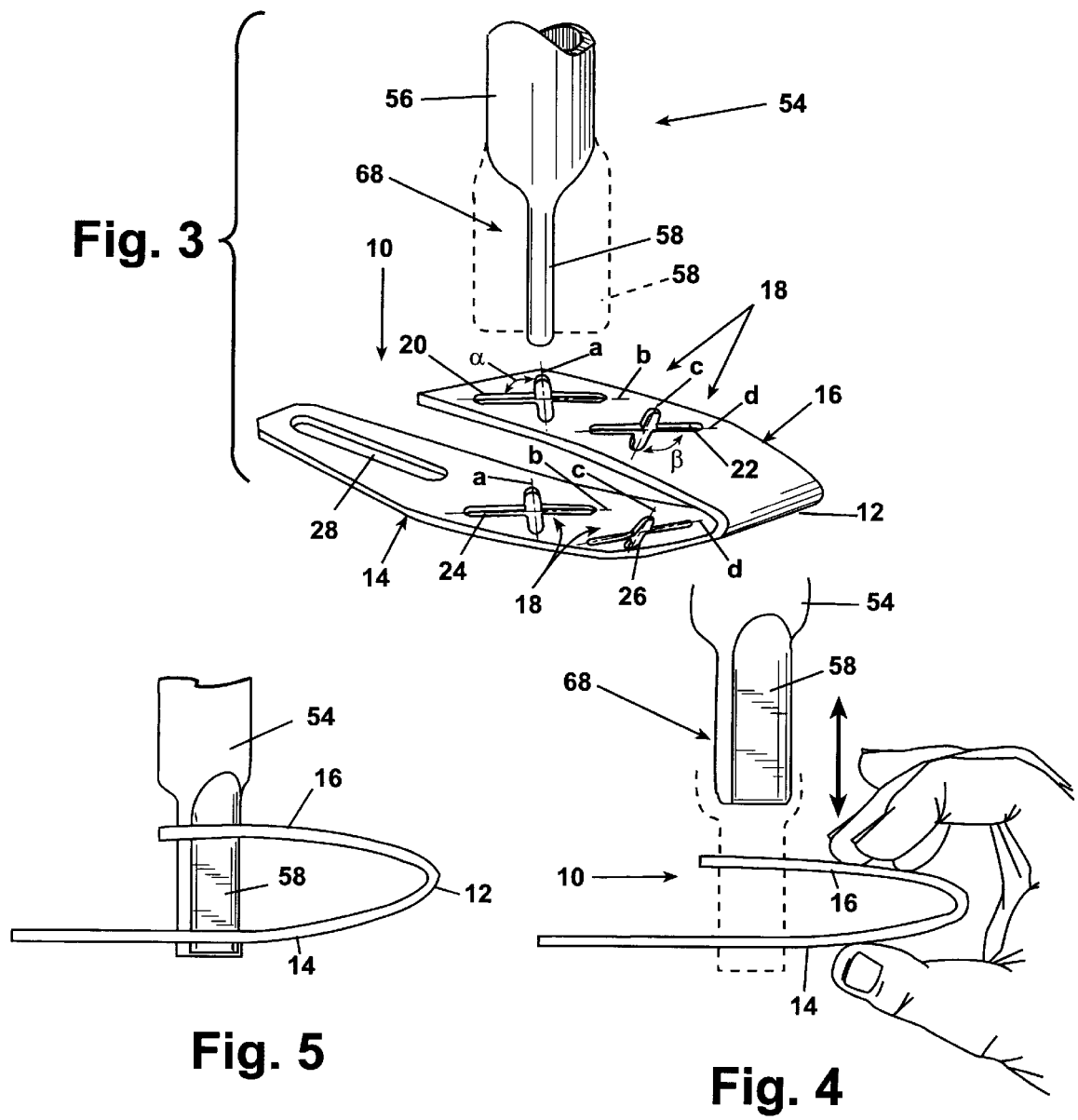

INDEXED COUPLER FOR POSITIONING A SHAFT IN MULTIPLE ANGULAR POSITIONS

CROSS REFERENCE TO RELATED APPLICATIONS

This application claims the benefit of U.S. Provisional Patent Application Ser. No. 60/093,210 filed on Jul. 17, 1998.

BACKGROUND OF THE INVENTION

1. Field of the Invention

This invention relates to ventilation systems, and particularly to a coupler for maintaining the pivoted damper blade in a ventilation system at a particular indexed position.

2. Related Art

Air volume dampers are used in the ventilation industry to regulate the amount of air to be supplied to or exhausted from a specific area. Conventional commercial dampers require tools to loosen, adjust, and re-tighten the means for positioning the damper blade within the air passageway in the duct. Upon installation of a ventilation system, this process is often repeated numerous times to achieve a proper balance of air flow among the various areas to be ventilated. An attempted improvement to this process, such as U.S. Pat. No. 4,949,625, requires many parts, such as a hinge and hinge bracket, and involves a more complicated installation, including riveting.

Further, it is often difficult to position a damper blade within a ventilation system with consistency because the ducts in different systems vary in size and configuration. These types of ventilation ducts are also often provided with actuators which require attachment to the damper blade shaft at a predetermined angular orientation which, if the angular positioning between the damper blade shaft and the actuator is skewed for any reason, mounting the damper blade shaft to the actuator can be extremely difficult and time-consuming.

SUMMARY OF THE INVENTION

In one aspect, the invention relates to a coupler for interconnecting a damper blade shaft having a keyed end with an actuator whereby movement of the actuator is imparted to the damper blade shaft via the coupler, the coupler comprising a socket adapted to receive the keyed end of the damper blade shaft in at least two angular positions. A connector is adapted to receive a portion of the actuator. The damper blade shaft can thereby be indexed to any one of the at least two positions relative to the actuator without additional fasteners when the keyed end of the damper blade shaft is received in the socket.

In another aspect, the invention relates to an improved air duct assembly of the type which has a damper blade journaled to ductwork, and which damper is movable by an actuator interconnected to a damper blade shaft having a keyed end via a coupler. The improvement in the coupler provides a convenient mounting between the actuator and the damper blade shaft. The coupler comprises a socket adapted to receive the keyed end of the damper blade shaft in at least two angular positions, and a connector adapted to receive a portion of the actuator. The damper blade shaft can thereby be indexed to any one of the at least two positions relative to the actuator without additional fasteners when the keyed end of the damper blade shaft is received in the socket.

In a further aspect, the invention relates to a kit for forming a moveable damper assembly in an air duct having a peripheral wall and an air flow passageway therethrough using a damper blade sized to fit and move within the air flow passageway. The kit includes a damper blade shaft adapted to be mounted to the damper blade and journaled to the duct, and has a keyed end thereon and an actuator having a mounting portion thereon. The kit also includes a coupler having a socket adapted to receive the keyed end of the damper blade shaft in at least two angular positions, and a connector adapted to receive the mounting portion of the actuator. The kit can thereby be assembled and retrofitted to the duct so that the damper blade shaft can be indexed to any one of the at least two positions relative to the actuator without additional fasteners when the keyed end of the damper blade shaft is received in the socket.

In other embodiments of the various aspects of the invention, the socket of the coupler can comprise at least two apertures having a cross-section corresponding generally to the keyed end of the damped blade shaft. The at least two apertures can be offset in angular orientation with respect to one another. The at least two apertures can comprise at least two sets of X-shaped apertures. The at least two sets of X-shaped apertures can comprise a first set of X-shaped apertures intersecting at a first angle and a second set of X-shaped apertures intersecting at a second angle. The second angle can be different than the first angle whereby the plurality of X-shaped apertures provides a multitude of configurations for interconnecting the actuator to the damper blade shaft.

In additional embodiments of the various aspects of the invention, a retainer can be interconnected to the socket to prevent dislodgement of the keyed end of the shaft from the socket. The retainer can comprises a first flange, a second flange, and a spring interconnecting the first and second flanges and biasing the first flange away from the second flange. The bias of the first flange away from the second flange thereby retains the damper blade shaft within the first mounting socket. The socket can be formed as a portion of each of the first and second flanges. The spring can comprise a resilient web of material interconnecting the first and second flanges. The connector can comprise a slot adapted to receive the portion of the actuator.

Other objects, features, and advantages of the invention will be apparent from the ensuring description in conjunction with the accompanying drawings.

BRIEF DESCRIPTION OF THE DRAWINGS

In the drawings:

FIG. 3 is a perspective exploded view of the coupler according to the invention and an end of a damper blade shaft shown in a first solid-line position and in a second phantom-line position;

FIG. 4 is a side elevational view of the coupler of FIG. 3 receiving the end of the damper blade shaft;

FIG. 5 is a side elevational view of the end of the damper blade shaft of FIG. 4 positioned within the coupler;

DETAILED DESCRIPTION

Figure 1:
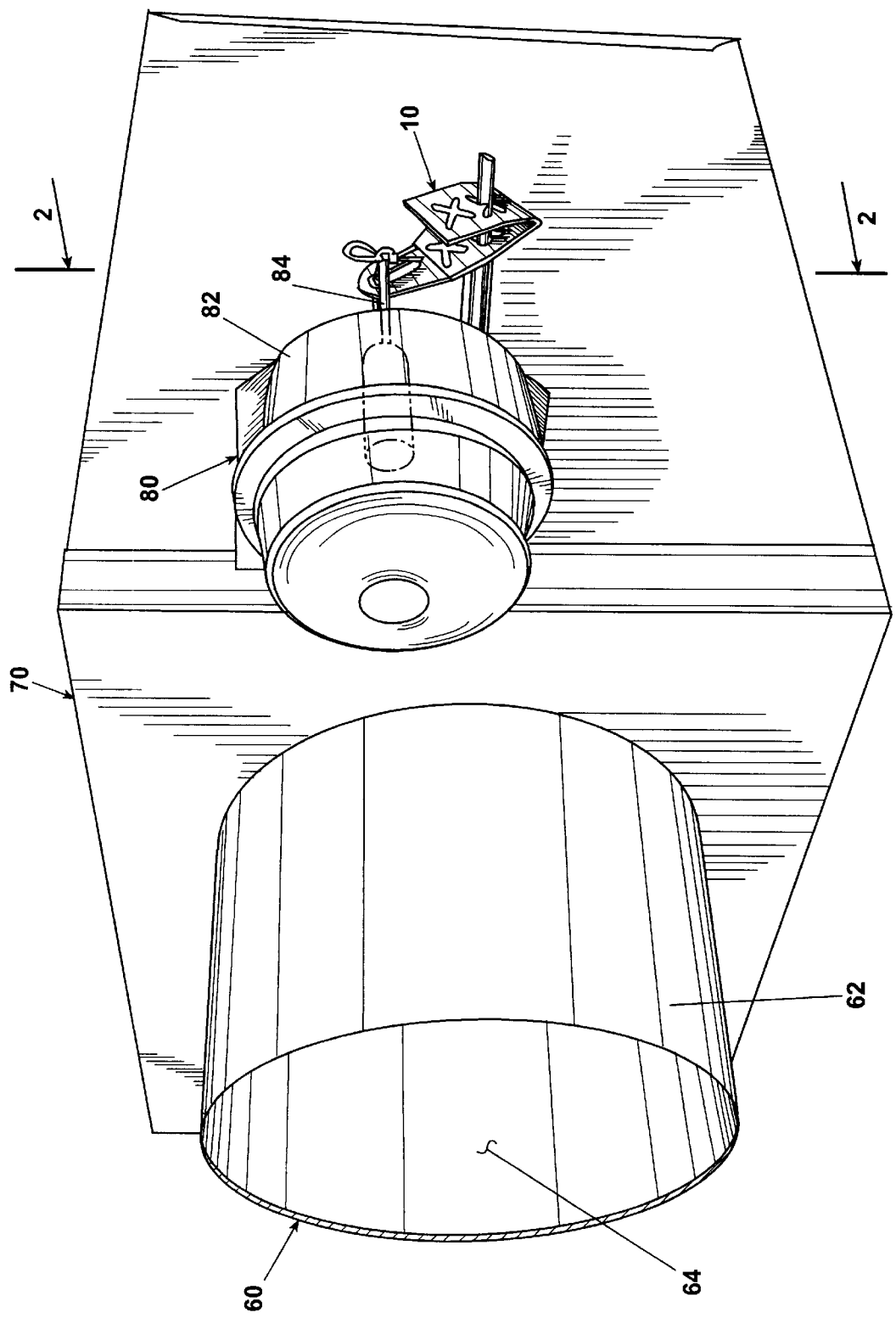
FIG. 1 is a perspective view of a ventilation system comprising a duct located within a housing having an actuator which is interconnected to a damper blade via an indexed coupler according to the invention.
Figure 2:
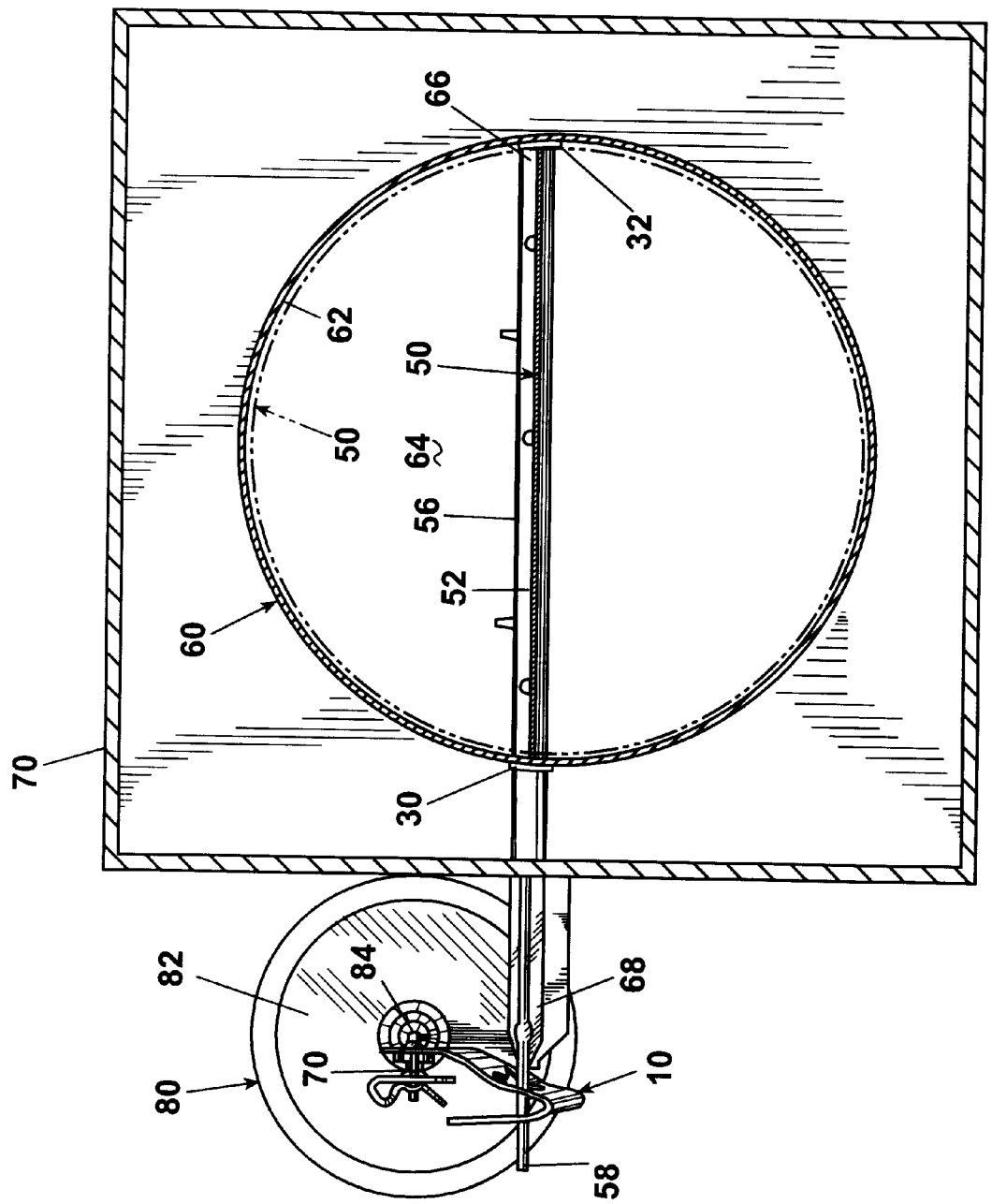
FIG. 2 is a cross-sectional view taken along line 2—2 of FIG. 1 showing the damper blade shaft and coupler interconnected to a damper blade positioned within the interior of the duct.
Figure 6:
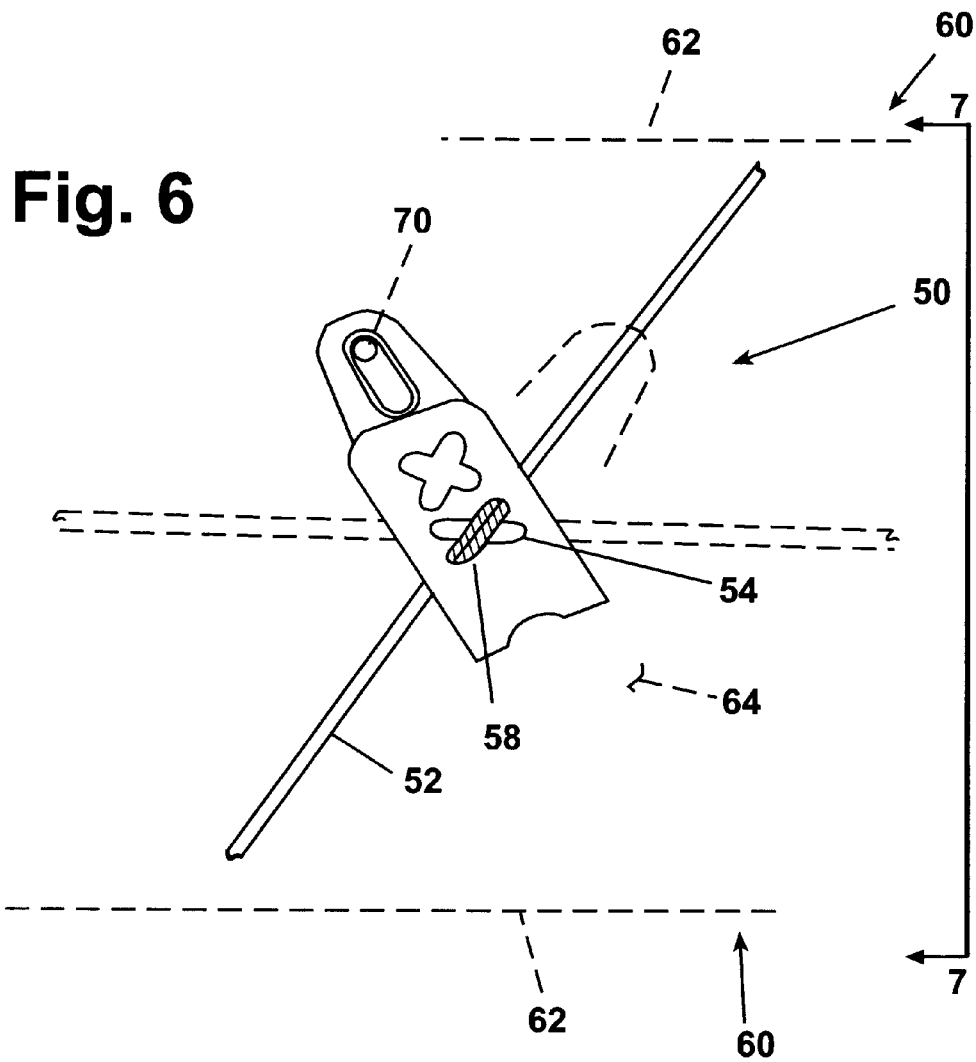
FIG. 6 is a partial cross-sectional schematic view of the damper blade of FIG. 1 mounted to the coupler according to the invention and shown in two positions in phantom lines.
Figure 7:
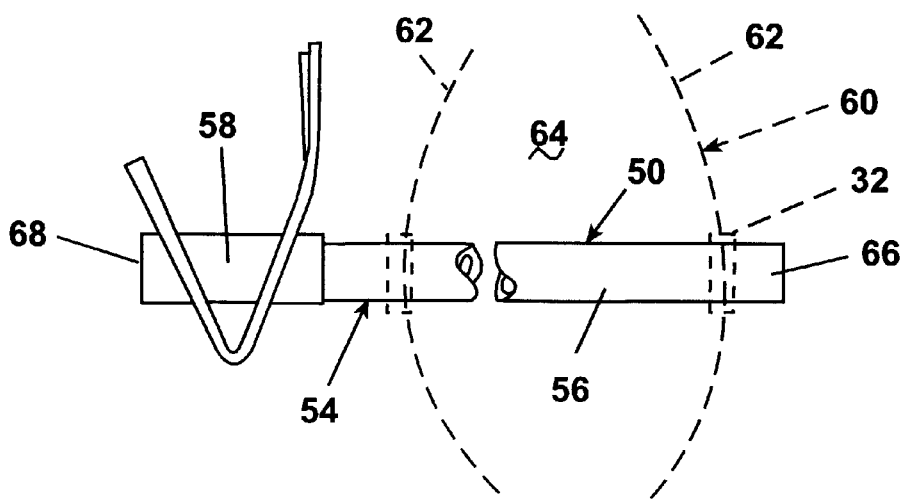
FIG. 7 is a side elevational end view of the coupler and shaft assembly taken along line 7—7 of FIG. 6 showing the journaling of the shaft to the walls of the duct.

Referring now to the drawings and to FIGS. 1–2 and 6–7 in particular, a duct 60 is shown provided in a housing 70. FIGS. 1–2 show the duct 60 and housing 70 in one configuration while FIGS. 6–7 show these respective components in a schematic fashion. The duct 60 is preferably ventilation conduit of a conventional type, comprising tubular or rectangular duct walls 62 that define a passageway 64 running therethrough. The duct 60 is typically connected to a source of warm or cool air (not shown) or both and communicates with a plurality of registers (not shown). It will be understood that the housing 70 can comprise a conventional ductwork housing or an interior portion of an existing wall, ceiling or floor infrastructure.

As shown by FIGS. 1–2 and 6–7, the passageway 64 of the duct 60 is preferably selectively closeable by a damper 50 which comprises a damper blade 52 pivotally mounted on a damper blade shaft 54. The damper blade 52 is preferably movably mounted to the duct between at least a first position wherein the damper blade 52 permits a greater degree of free-flowing air through the passageway 64 and a second position wherein the damper blade 52 generally obstructs the passageway 64 to prohibit flow of air therethrough.

The damper blade 52 is typically a flow restricting member centrally and longitudinally mounted within the passageway 64 of the duct 60. The damper blade shaft 54 comprises an elongated member 56 having a first end 66 and a second end 68. The shaft 56 is preferably journaled within bearings 30 and 32 in the duct walls 62 and extends across the passageway 64. The second end 68 of the shaft 56 is machined or otherwise deformed to provide a rounded rectangular or elliptical flange 58 thereon.

An actuator 80 is shown in FIGS. 1–2 comprising a cylinder 82 having an axially-extendable piston 84 therein. The piston 84 is interconnected to the second end 68 of the damper blade shaft 56 by an indexed coupler 10 according to the invention. The piston 84 is preferably movable with respect to the cylinder 82 between at least a first position and a second position wherein the first and second positions of the piston 84 position the damper blade in the firs and second positions therefor. Movement of the piston is translated to rotation of the damper blade shaft 56 by the coupler 10. It will be understood that, although an automatic actuator 80 is shown by example in the drawings, a manual actuator such as a handle, knob or slide could also be employed without departing from the scope of this invention.

It is an important feature of this invention that the coupler 10 facilitates the interconnection of the actuator 80 with the damper blade shaft 56 with a greater degree of assembly ease than was previously encountered with respect to the prior art. It will be understood that it is important to locate the damper blade 52 within the passageway 64 of the duct 60 so that the first and second positions restrict or permit air flow through the duct in a desired volume and velocity. Often the position of the actuator 80 (such as the orientation of the piston 84) and the angular orientation of the second end 68 of the damper blade shaft 56 do not register with one another. An installer must often manipulate (bend or otherwise deform) prior art couplers to allow the translation of movement of the actuator 80 to the damper 50.

It is also an important feature of this invention that the coupler 10 could be sold as a unit by itself, retrofitted as a kit for existing ductwork, or installed originally on new ductwork.

The coupler 10 thereby facilitates this installation according to the invention by interconnecting the actuator 80 and the damper 50 by a socket which has multiple apertures for alignment with either the damper blade shaft 54 or the actuator 80. The description herein relates to the ability of the coupler 10 to align with the damper blade shaft 54, however, it is contemplated that the same components could be aligned elsewhere on the coupler 10 to align with the actuator.

As best shown in FIGS. 3–4, the coupler 10 comprises a resilient flange bent along a transverse axis 12 to define a lower portion 14 and an upper portion 16. The lower portion 14 and the upper portion 16 comprise substantially rectangular flanges having a plurality of indexing apertures 18 for receiving the flange 58 at the second end 68 of the shaft 54. The lower portion 14 includes a connector, such as an elongated slot shown in the drawings at 28 for receiving a mounting portion of the actuator 80, such as clevis pin 70 for connecting the coupler 10 to the piston 84 of the actuator 80.

Each indexing aperture 18 comprises an X-shaped indexing slot extending through the lower portion 14 and vertically aligned with a corresponding X-shaped indexing slot in the upper portion 16. More specifically, as illustrated in FIG. 1, the upper portion 16 includes a pair of X-shaped indexing slots 20 and 22 which correspond to a pair of X-shaped indexing slots 24 and 26, respectively, disposed within the lower portion 14. It will be understood that the apertures 20–26 form a several sockets each adapted to receive the second end 68 of the damper blade shaft 56. Other configurations of the socket are contemplated without departing from the scope of the invention such as different shapes for the apertures and a closed-end recesses rather than open apertures.

The first set of vertically-aligned X-shaped indexing slots 20, 24, which have diagonal axes a and b, are diagonally offset at a first angle $\alpha$; the second set of vertically-aligned X-shaped indexing slots 22, 26, which have diagonal axes c and d, are diagonally offset at a second angle $\beta$.

It will be understood that the angle at which the flange 58 on the second end 68 of the shaft 54 is positioned relative to the indexed coupler 10 is selectable by choosing among the diagonal axes a or b of the set of X-shaped apertures 20, 24 or the diagonal axes c and d of the set of X-shaped apertures 22, 26. Preferably, the angles $\alpha$ and $\beta$ of the sets of X-shaped indexing slots 20–26 are determined so as to provide the greatest number of settings to retain the flange 58 of the pivot 54 therein.

Thus, the actuator 80 can be easily interconnected to the shaft 54 via the coupler 10 regardless of any misalignment between the piston 84 and the second end 68 of the shaft 54. The indexed coupler 10 is mounted to the flange 58 of the pivot 54 by grasping the coupler 10 adjacent the transverse axis 12 and urging the lower portion 14 and upper portion 16 toward one another. The second end 68 of the pivot 54 is then inserted along one of the diagonal axes a–d into one of the sets of X-shaped apertures 20–26, as shown in FIG. 2. The set of X-shaped apertures which most closely aligns with the second end 68 of the shaft 54 is preferably selected to minimize any preloading or strain on the coupler 10, actuator 80 or shaft 54.

The pinching force is then released so as to allow a natural tendency of the indexed coupler 10 to spring outwardly and retain the flange 58 of the second end 68 of the pivot 54 within the selected indexing aperture 18 and against longitudinal movement, as shown in FIG. 3. The upper and lower portions 14 and 16 form a retainer whereby the bias of the portions 14 and 16 away from each other provide the requisite retaining friction needed. The spring-biased retainer shown in the drawings is a preferred embodiment due to its simplicity, however, other retainers are contemplated without departing from the scope of this invention including set screws, detent mechanisms, latches, etc. which are well known in the art.

By compressing the lower portion 14 and the upper portion 16 together, the second end 68 is free to be removed from the aperture 18 of the indexed coupler 10. The securing of the flange 58 of the pivot 54 along a particular diagonal axis a–d into one of the sets of X-shaped apertures 20–26 determines an initial position of the damper blade 52 within the air passageway 64 of the duct 60. Each diagonal a, b, c, d sets the damper blade 52 of the pivot 54 at a different angle within the air passageway 64 for controlling air flow therethrough.

In operation, air under pressure will be supplied through the passageway in the duct 60. The amount of air that will be communicated to various registers in the ventilation system will be regulated by the position of the damper blade 52 within the air passageway 64 of the duct 60. The damper blade 50 is typically journaled within bearings 30 and 32 so that the flange 58 extends beyond the walls 62 of the duct 60. The actuator 80 can then be activated to move the piston 84 between the first and second positions, which thereby moves the shaft 54 and, in turn, the damper blade 52, between the first and second positions to selectively obstruct and permit air flow through the passageway 64 of the duct 60.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A coupler for interconnecting a damper blade shaft having a keyed end with an actuator whereby movement of the actuator is imparted to the damper blade shaft via the coupler, the coupler comprising:
    a socket adapted to receive the keyed end of the damper blade shaft in at least two angular positions; and
    a connector adapted to receive a portion of the actuator;
    whereby the damper blade shaft can be indexed to any one of the at least two positions relative to the actuator without additional fasteners when the keyed end of the damper blade shaft is received in the socket.

2. The coupler of claim 1 wherein the socket comprises at least two apertures having a cross-section corresponding generally to the keyed end of the dampened blade shaft, the at least two apertures being offset in angular orientation with respect to one another.

3. The coupler of claim 2 wherein the at least two apertures comprises at least two sets of X-shaped apertures.

4. The coupler of claim 3 wherein the at least two sets of X-shaped apertures comprises a first set of X-shaped apertures intersecting at a first angle and a second set of X-shaped apertures intersecting at a second angle, the second angle being different than the first angle whereby the plurality of X-shaped apertures provides a multitude of configurations for interconnecting the actuator to the damper blade shaft.

5. The coupler of claim 1 and further comprising a retainer interconnected to the socket to prevent dislodgement of the keyed end of the shaft from the socket.

6. The coupler of claim 5 wherein the retainer comprises:
    a first flange;
    a second flange; and
    a spring interconnecting the first and second flanges and biasing the first flange away from the second flange;
    whereby the bias of the first flange away from the second flange retains the damper blade shaft within the first mounting socket.

7. The coupler of claim 6 wherein the socket is formed as a portion of each of the first and second flanges.

8. The coupler of claim 7 wherein the spring comprises a resilient web of material interconnecting the first and second flanges.

9. The coupler of claim 1 wherein the connector comprises a slot adapted to receive the portion of the actuator.

10. In an air duct assembly of the type which has a damper blade journaled to ductwork, which damper is movable by an actuator interconnected to a damper blade shaft having a keyed end via a coupler, the improvement in the coupler for providing a convenient mounting between the actuator and the damper blade shaft comprising:
    a socket adapted to receive the keyed end of the damper blade shaft in at least two angular positions; and
    a connector adapted to receive a portion of the actuator;
    whereby the damper blade shaft can be indexed to any one of the at least two positions relative to the actuator without additional fasteners when the keyed end of the damper blade shaft is received in the socket.

11. The air duct assembly of claim 10 wherein the socket comprises at least two apertures having a cross-section corresponding generally to the keyed end of the damped blade shaft, the at least two apertures being offset in angular orientation with respect to one another.

12. The air duct assembly of claim 11 wherein the at least two apertures comprises at least two sets of X-shaped apertures.

13. The air duct assembly of claim 12 wherein the at least two sets of X-shaped apertures comprises a first set of X-shaped apertures intersecting at a first angle and a second set of X-shaped apertures intersecting at a second angle, the second angle being different from the first angle whereby the plurality of X-shaped apertures provides a multitude of configurations for interconnecting the actuator to the damper blade shaft.

14. The air duct assembly of claim 13 and further comprising a retainer interconnected to the socket to prevent dislodgement of the keyed end of the shaft from the socket.

15. The air duct assembly of claim 14 wherein the retainer comprises:
    a first flange;
    a second flange; and
    a spring interconnecting the first and second flanges and biasing the first flange away from the second flange;
    whereby the bias of the first flange away from the second flange retains the damper blade shaft within the first mounting socket.

16. The air duct assembly of claim 15 wherein the socket is formed as a portion of each of the first and second flanges.

17. The air duct assembly of claim 16 wherein the spring comprises a resilient web of material interconnecting the first and second flanges.

18. The air duct assembly of claim 10 wherein the connector comprises a slot adapted to receive the portion of the actuator.

19. A kit for forming a moveable damper assembly in an air duct having a peripheral wall and an air flow passageway therethrough using a damper blade sized to fit and move within the air flow passageway, comprising:

a damper blade shaft adapted to be mounted to the damper blade and journaled to the duct, and having a keyed end thereon;

an actuator having a mounting portion thereon;

a coupler having a socket adapted to receive the keyed end of the damper blade shaft in at least two angular positions, and a connector adapted to receive the mounting portion of the actuator;

whereby the kit can be assembled and retrofitted to the duct so that the damper blade shaft can be indexed to any one of the at least two positions relative to the actuator without additional fasteners when the keyed end of the damper blade shaft is received in the socket.

20. The kit of claim 19 wherein the socket comprises at least two apertures having a cross-section corresponding generally to the keyed end of the damped blade shaft, the at least two apertures being offset in angular orientation with respect to one another.

21. The kit of claim 20 wherein the at least two apertures comprises at least two sets of X-shaped apertures.

22. The kit of claim 21 wherein the at least two sets of X-shaped apertures comprises a first set of X-shaped apertures intersecting at a first angle and a second set of X-shaped apertures intersecting at a second angle, the second angle being different from the first angle whereby the plurality of X-shaped apertures provides a multitude of configurations for interconnecting the actuator to the damper blade shaft.

23. The kit of claim 22 and further comprising a retainer interconnected to the socket to prevent dislodgement of the keyed end of the shaft from the socket.

24. The kit of claim 23 wherein the retainer comprises:

a first flange;

a second flange; and a spring interconnecting the first and second flanges and biasing the first flange away from the second flange;

whereby the bias of the first flange away from the second flange retains the damper blade shaft within the first mounting socket.

25. The kit of claim 24 wherein the socket is formed as a portion of each of the first and second flanges.

26. The kit of claim 25 wherein the spring comprises a resilient web of material interconnecting the first and second flanges.

27. The kit of claim 19 wherein the connector comprises a slot adapted to receive the portion of the actuator.

* * * * *

UNITED STATES PATENT AND TRADEMARK OFFICE
CERTIFICATE OF CORRECTION

PATENT NO.: 6,135,137

DATED: October 24, 2000

INVENTOR(S): Roger P. Engelke

It is certified that error appears in the above-identified patent and that said Letters Patent are hereby corrected as shown below:

Col. 6, claim 13, line 47, and
Col. 8, claim 22, line 6,
    the word "from" in both sentences should be "than."

Signed and Sealed this

Eighth Day of May, 2001

*Attest:*

NICHOLAS P. GODICI

*Attesting Officer*     *Acting Director of the United States Patent and Trademark Office*